United States Patent [19]
Abrams et al.

[11] 4,069,147
[45] Jan. 17, 1978

[54] WASTE WATER TREATMENT WITH OXYGEN

[75] Inventors: Edward Abrams; Anthony J. Masella, both of Chicago, Ill.

[73] Assignee: Chemetron Corporation, Chicago, Ill.

[21] Appl. No.: 710,615

[22] Filed: Aug. 2, 1976

Related U.S. Application Data

[63] Continuation-in-part of Ser. No. 507,543, Sept. 19, 1974, abandoned, which is a continuation of Ser. No. 326,441, Jan. 24, 1973, abandoned.

[51] Int. Cl.$^2$ ................................................. C02C 1/02
[52] U.S. Cl. ......................................... 210/6; 210/14; 210/15
[58] Field of Search ....................................... 210/2-9, 210/11, 14, 15, 16, 18, 24, 195, 205, 218, 219

[56] References Cited

U.S. PATENT DOCUMENTS

| | | | |
|---|---|---|---|
| 3,235,487 | 2/1966 | Westgarth | 210/6 |
| 3,557,954 | 1/1971 | Welch | 210/6 |
| 3,725,258 | 4/1973 | Spector et al. | 210/15 |
| 3,763,039 | 10/1973 | Wilson | 210/6 |
| 3,803,029 | 4/1974 | Blecharczyk | 210/17 |
| 3,872,003 | 3/1975 | Walker | 210/15 |

OTHER PUBLICATIONS

Ullrich et al., "The Bio-sorption Process of Sewage and Waste Treatment," Sewage & Ind. Wastes 23, 1248, 1951.

Ullrich et al., "Biosorption at Austin Texas," Sewage & Ind. Wastes, 29, 400, 1957.

*Primary Examiner*—Thomas G. Wyse
*Assistant Examiner*—Peter A. Hruskoci
*Attorney, Agent, or Firm*—Mason, Kolehmainer, Rathburn & Wyss

[57] ABSTRACT

The organic pollutants in a waste water stream can be reduced 90–95% by providing oxygen to sludge organisms for biological oxygenation of the pollutants. The raw waste water and activated organisms (sludge containing little or no pollutants) are mixed in a vessel for less than 30 minutes. In this vessel, the organisms absorb and adsorb 90–95% of the organic pollutants present in the influent raw waste water. Any means for gentle agitation can be used in this vessel. The waste-enriched organisms are separated from the supernatant liquid in a clarifier and sent to an oxygenation vessel where the organisms metabolize the waste by treatment with an oxygen-containing gas having at least 30% by volume oxygen. The thus-activated organisms are returned to the mixed liquor vessel to complete the cycle.

14 Claims, 2 Drawing Figures

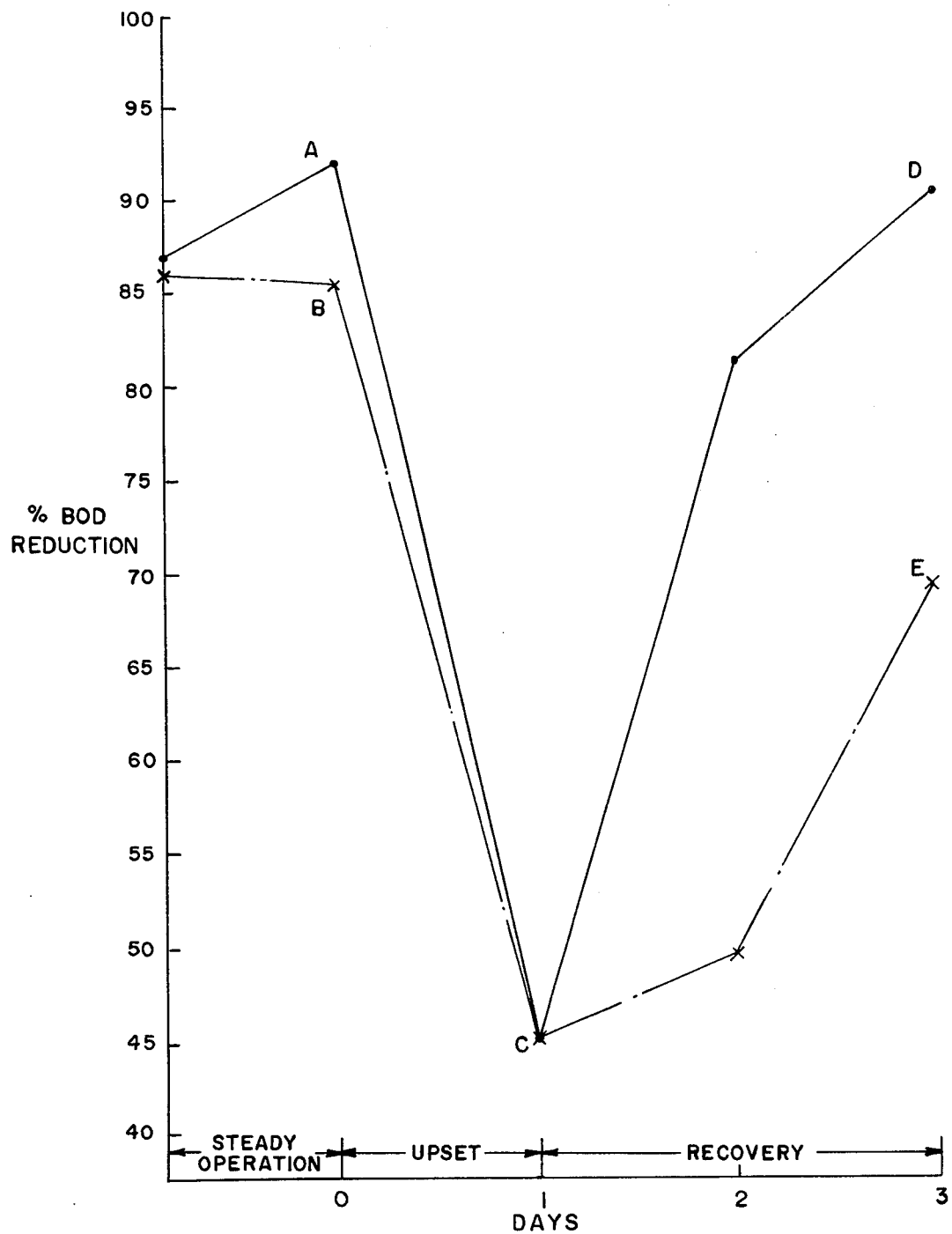

WASTE WATER TREATMENT WITH OXYGEN

CROSS REFERENCE TO RELATED APPLICATIONS

This application is a continuation-in-part of Ser. No. 507,543 filed Sept. 19, 1974, now abandoned, which application is a continuation of Ser. No. 326,441 filed Jan. 24, 1973, now abandoned.

The present invention is directed toward the problem of reducing the soluble, insoluble and colloidally suspended organic matter in a large variety of liquid wastes. These organics in waste streams are converted by using a common aerobic biological process referred to as the activated sludge process.

An object of the present invention is to provide an activated sludge waste water treatment process which accomplishes the conversion of organic material in waste streams to innocuous end products in less time than that heretofore known in the art.

Another object is to provide a process which uses oxygen to oxygenate organic material which has previously been absorbed and adsorbed by activated sludge.

Another object of the present invention is to provide a process which utilizes oxygen in a most efficient manner.

Another object of the present invention is to provide an oxygen process for destroying organic material in liquid wastes, which most efficiently separates the processes of (1) the absorption and adsorption of impurities from a waste water stream by the sludge, and (2) the oxygenation and thereby the destruction of these impurities.

Another object of the present invention is to provide a waste water treatment process in which an oxygen containing gas, having an oxygen content of at least 30% by volume, is used for oxygenation.

Another object of the present invention is to provide a process in which oxygen can be used for oxygenation with substantially no venting or wasting of oxygen-enriched gas.

Another object of the present invention is to provide a process which utilizes oxygen but does not require a closed mixing vessel for the organic waste absorption step of the process.

Another object of the present invention is to provide a process which does not require oxygen for the organic waste absorption and adsorption step of the process.

Another object of the present invention is to provide a process which requires very little agitation in the organic waste absorption and adsorption step of the process.

Another object of the present invention is to provide a process which does not require dissolved oxygen (DO) for the absorption and adsorption of organic waste from the influent waste water.

Another object of the present invention is to provide a process which requires very little or no adjustment to the operating parameters when the system is shocked with a drastic change such as a sudden surge of the BOD level of the incoming waste stream.

Another object of the present invention is to provide a waste water treatment process in which the amount of make-up oxygen fed to the oxygenation vessel can be varied depending upon the incoming BOD level and the necessary DO.

Another object of the present invention is to provide a process for treating waste water in which the DO can be varied for oxygenation purposes, by varying the amount of oxygen to the oxygenation vessel, without affecting the oxygenation vessel agitation and without affecting the conditions necessary for the absorption and adsorption of the organic pollutants.

Another object of the present invention is to provide a process for treating sewage water in which the effluent BOD level is within that required by law and which process can be easily adapted by almost any existing sewage treatment plant by simple modifications.

Another object of the present invention is the provision of a process wherein the organisms are highly concentrated when treated with oxygen.

Another object of the invention is the provision of a process wherein the quantity of activated organisms recycled in varied in response to the BOD content of the influent waste water.

A further object of the invention is the provision of a process wherein excess organisms are in a food-rich, oxygen-deficient condition when segregated for a subsequent sludge wasting operation.

BACKGROUND OF THE INVENTION

For a discussion of the BOD (Biochemical Oxygen Demand), see the following articles: E. M. Davis, BOD vs. COD vs. TOC vs. TOD, Water and Wastes Engineering, Feb. 1971, pages 32–35; K. M. Peil and A. F. Gaudy, Jr., Kinetic Constants for Aerobic Growth of Microbial Populations Selected with Various Single Compounds and with Municipal Wastes as Substrates, Vol. 21, No. 2, Feb. 1971, pages 253–256; E. L. Barnhart and G. J. Kehrberger, A Critical Review of UOD Analysis Using Respirometer Techniques, Vol. 135, Part 2, Engineering Bulletin of Purdue University, 1969, pages 1385–1397; Sludge/BOD Ratio is key to Wastewater Cleanup, Chemical Engineering, Apr. 21, 1969, pages 60–62.

The object of any waste water treatment operation is to remove the contaminants from the waste water so that the effluent, or treated water, has a low enough BOD level that it can be lawfully discharged into the nearest water source.

The activated sludge process is not a single precise biological or physical process. It is the combination of several basic processes interacting both independently and dependently. The activated sludge process constitutes four basic sub-processes as follows: (1) Basic respiration and metabolism of aerobic bacterial cells. (2) Mass transfer of nutrients in the substrate and dissolved oxygen to the cell surface and removal of metabolic waste products. Nutrients, commonly referred to as BOD, are the carbonaceous organic compounds in the liquid medium that provide food for cell growth and energy. (3) Supplying of oxygen from the atmosphere or other sources to the waste in the liquid. (4) The aggregation or flocculation of the individual microorganisms into masses or matrices usually of the order of a hundred times the size of the individual bacterial cells.

Prior to the present invention, it was thought that the greatest influence which the engineer could exercise over the waste treatment process in obtaining the optimum performance from the activated sludge process was in the second listed basic sub-process. Great importance was placed on the influence which the type and degree of agitation or turbulence has on the transfer of DO and thought to be essential for mass transfer of nutrients to individual cells and into and through agglomerations of these cells. See the following articles concerned with the importance of the dissolved oxygen: R. A. Ryder, Dissolved Oxygen Control in Activated Sludge, Vol. 135, Part 1, 1969, Engineering Bulletin of Purdue University, pages 238-253; G. F. Bennett, Relationship Between Dissolved Oxygen Concentration and Oxygen Utilization Rates in Activated Sludge Waste Treatment, Vol. 63, No. 78, Chemical Engineering Progress Symposium Series, pages 171-177; G. J. Thabaraj and G. J. Gaudy, Jr., Effect of Dissolved Oxygen Concentration on the Metabolic Response of Completely Mixed Activated Sludge, Vol. 135, Part 1, 1969, Engineering Bulletin of Purdue University, pages 69-86.

It was thought that the nutrient or organic waste substrate which is the source of energy and growth material for the sludge cells could not be adequately absorbed and adsorbed onto the cells, when the waste water and sludge were mixed together, unless sufficient microagitation or turbulence was provided, and unless the proper amount of dissolved oxygen in the waste water was also provided (see an article by A. A. Kalinske, Journal of Water Pollution Control Federation, Vol. 43, No. 1, January 1971, Effect of Dissolved Oxygen and Substrate Concentration on the Uptake Rate of Microbial Suspensions).

In the conventional activated sludge system, activated sludge (microorganisms that are viable or "hungry" and require soluble organic food) is mixed with raw sewage together with large amounts of air or oxygen. Within a short time, the hungry organisms absorb and adsorb most of the soluble organic waste. In the case of air, as in conventional systems, the air serves to agitate the sludge and keep it in suspension to provide adequate distribution of organisms in the sewage; but, in systems employing relatively pure oxygen, it is wasteful and uneconomical if used for agitation. Some systems that make use of oxygen for agitation in the early stages of activated sludge operation are completely enclosed in order to conserve the unassimilated oxygen which is used in a later stage downstream when the organisms have absorbed large quantities of organic matter. In the end, these systems waste significant quantities of oxygen to the atmosphere.

PRIOR ART

Many waste water treatment systems require intimate contact of oxygen with the raw waste and sludge in the mixed liquor vessel where sludge and waste first come in contact with each other. If vigorous agitation is used to achieve this intimate contact and to increase the dissolution of oxygen, the flocculant agglomerates of bacteria are comminuted and dispersed so that the final effluent becomes more turbid and retains a relatively high BOD.

The use of oxygen in a waste water treatment system is not new; for example, see the following references: Levin U.S. Pat. No. 3,565,796; J. E. Ball and M. J. Humenick, High-Purity Oxygen in Biological Treatment of Municipal Waste Waters, Vol. 44, No. 1, January 1972, Journal of Water Pollution Control Federation, pages 65-76; C. P. Poon and K. Wang, Oxygenation and High-Rate Biological Treatment Process, Vol. 44, No. 2, February 1972, Journal of Water Pollution Control Federation, pages 265-273; W. E. Budd and G. F. Lambeth, High-Purity Oxygen in Biological Sewage Treatment, Vol. 29, No. 3, March 1957, Sewage and Industrial Wastes, pages 237-257; and J. R. McWhirter, Oxygen vs Air: In Treatment of Secondary Wastewater, Cryogenics & Industrial Gases, November/December 1971, pages 17-22.

Late developments are found in patents to McWhirter (see U.S. Pat. Nos. 3,547,811-3,547,815 and 3,670,887). The McWhirter oxygen system makes use of high purity oxygen for both absorption and oxygenation and requires 1.5 to 3 hours, at best, for these processes. Further, each successive stage in the McWhirter system receives a lesser percentage of oxygen than the previous stage.

The McWhirter system must use the gas from previous stages in successive stages in order to efficiently utilize the unassimilated oxygen in the system. The gas from the last McWhirter stage, which contains unused oxygen, is either vented to the atmosphere or is utilized for aerobic digestion of the excess sludge. The use of oxygen for aerobic digestion of excess sludge is certainly not necessary in a waste water treatment system since an anaerobic digestion can be used which does not require oxygen. The invention described herein permits the discretionary use of either aerobic or anaerobic digestion of excess sludge.

Further, the McWhirter patents teach the venting to the atmosphere of gas from the digester which contains more than 21% oxygen. This gas is not recycled to the oxygen inlet. On the other hand, applicants' system described in this specification does not waste oxygen.

Another prior art process for waste water treatment is the contact stabilization process. In this process, waste water and stabilized sludge are brought into contact for a short period in a contact aeration vessel. The sludge is then removed from the treated water by sedimentation and transferred to a stabilization vessel where aeration is continued until the sludge is sufficiently stabilized. The stabilized sludge then is recycled back to the contact vessel and mixed with the waste water (see an article by A. H. Ullrich, et al., Vol. 23, Sewage and Industrial Waste, October 1951, pages 1248-1253; and an article by R. H. Siddiqi, et al., Vol. 39, No. 7, Journal of Water Pollution Control Federation, July 1967, pages 1211-1222). Another method described in Spector, et al. U.S. Pat. No. 3,725,258 employs high purity oxygen in the initial contact vessel to substantially oxygenate in the mixed liquor vessel.

The contact stabilization process customarily employs air both during the waste water/activated sludge contact period and during aeration. For any contact stabilization system to be effective, there must be excellent separation of the BOD-rich sludge from the effluent. If not, the system would allow a prohibited amount of BOD, via the effluent, to reach the stream.

The contact stabilization process was originally thought to be effective with contact times as low as 15 to 30 minutes for the organic waste absorption step and 90 minutes for aeration. However, it has been found that to operate a contact stabilization plant, a three-hour detention time in the absorption zone is required (see the article by Dague, et al., Vol. 44, No. 2, Journal of Water Pollution Control Federation, February 1972, pages 255-264). It was found that the longer contact time had a dramatic effect on the efficiency and operational stability of the contact stabilization process.

In addition to the three-hour absorption detention time, typical designs included a minimum of 6 hours of detention in the aeration zone. Thus, in actual practice the times used in the contact stabilization type of waste water treatment were greater than those times used in a conventional activated sludge process. Further, it was found that a sudden surge of high BOD content material — more commonly referred to as an "upset" in the system — would cause the system to become unstable and would require a long period of time before the system would return to steady operation.

Attempts to solve the problems found in the contact stabilization waste water system resulted in an increase in the detention time in the aeration tank to approximately nine hours. This increased the detention time to beyond that which is used in a standard activated sludge process and therefore increased the size of the equipment needed.

Because of the amount of detention time in each vessel which has been found to be necessary in the contact stabilization system, the design of new waste water treatment plants for larger systems was confined mainly to the activated sludge process. In a system which is required to handle a large amount of waste water each day, the long detention times of the contact stabilization system may make the required size of the vessels prohibitive. The use of oxygen in waste water systems has therefore been confined only to the activated sludge process.

FIELD OF THE INVENTION

The method of this invention makes use of an oxygen containing gas having oxygen in a concentration of at least 30% by volume for the oxidative assimilation stage after the organisms have absorbed and adsorbed a maximum of organic pollutants. The most efficient system has an oxygenation vessel which has a gas-tight cover so that any unassimilated oxygen which remains in the head space (the gas-filled area between the water level and the top of the vessel) can be recycled and supplemented with oxygen from the oxygen supply. Alternatively, if the geometry of the oxygenation vessel or the use of mechanical gas-liquid contact devices enables the adsorption of substantially most of the oxygen in a single pass through the vessel, it may be possible to dispense with the gas-tight cover in the interest of economy. In such case, the loss of oxygen to the atmosphere will be minimal and may be offset by the savings in the cost of the vessel cover. Where microbubble diffusers are used a covered vessel may not be required as almost all of the required oxygen is retained in the sludge liquor due to intimate contact of oxygen to liquid. The term "microbubble diffuser" is intended to include any gas-dispersing diffuser which dispenses very tiny bubbles (i.e. less than about 0.5 mm. in diameter) into a liquid medium, and which is highly efficient for the purpose of mass transfer from gas to liquid because of a high degree of gas-liquid interfacial contact. Generally, more than 75% of the dispersed oxygen is retained in the oxygenation vessel sludge liquor by using a tiny bubble diffuser for dispersion of oxygen.

Any type of apparatus for contacting oxygen with water can be used as the oxygen-liquid contacting means in the oxygenation vessel. For example, porous diffusers have been used with compressed air for many years and can be equally useful in the present invention for dispersing oxygen in the oxygenation vessel. Further, many types of diffusers have been developed in an attempt to reduce the problem of clogging of the small openings as a result of chemical deposition and biological growths.

Submerged turbines have also been used as aeration apparatus in waste water systems and are equally applicable in the herein described oxygenation vessel for dispersing oxygen. The turbines have a distinct advantage over plain air diffusers since the openings in the sparge rings are sufficiently large that no clogging occurs.

Since the amount of oxygen transfer is dependent upon the gas-liquid interfacial area, there has been much work in the area of fine or microbubble diffusers in an attempt to increase the oxygen-transfer efficiency. The main problem encountered with fine bubble diffusers is the tendency of such diffusers to clog either externally, by tank materials, or internally, by particulate matter from the gas supply. Otherwise, the fine bubble diffusers provide a high oxygen-transfer efficiency.

Diffusers which produce very tiny bubbles or microbubbles as recently developed are disclosed in the Laird, et al. U.S. Pat. No. 3,671,022, and Anthony, et al. U.S. Pat. No. 3,505,213 and can be used to dissolve oxygen in the oxygenation vessel of the present invention. If such microbubble diffusers are used, the oxygen-transfer efficiency may be so high that an oxygenation vessel cover may not be required. In that case, there may be a slight waste of oxygen since the oxygen-transfer efficiency will be less than 100% and since the oxygen not dissolved will not be collected for recycling.

Other recent developments in the area of minute bubble apparatus can also be used in the oxygenation vessel of the present invention. For example, see U.S. Pat. Nos. 3,503,593; 3,642,260; 3,643,403; 3,645,892; and 3,679,187. The question as to whether any of these new diffusers can be used without an oxygenation vessel cover is a question of economic evaluation which can easily be accomplished, once the efficiency of the particular diffuser is determined. Gas absorption towers of various types also are contemplated for the oxygenation step.

In a preferred embodiment of this process, the settled "food-rich" sludge from the clarifier is oxygenated in the sealed oxygenation vessel. Then, the oxygenated (activated) sludge is mixed with raw waste in the mixed liquor vessel. When the sludge organisms leave the mixed liquor vessel, in which the sludge and waste liquor are first brought into contact, the sludge is in a "food-rich" condition for optimum oxygenation. It has been found that a system operating in this manner can use oxygen for the treatment of organic waste material in a most economical and efficient manner.

This invention further contemplates the method of treating waste water comprising the steps of separating foodrich organisms from treated waste water at a waste metabolizing concentration of more than about 10,000 ppm., supplying oxygen in a concentration of at least 30% by volume to said concentrated organisms to metabolize the food and develop hungry organisms, and adding the hungry organisms to raw waste having a BOD content of more than 10 ppm. The quantity of organisms added to the waste water desirably is sufficient to adsorb and absorb substantially all the BOD of the raw waste water.

An important feature of the present invention is to substantially completely oxygenate the BOD content of a waste water in a single vessel with an oxygen-containing gas having an oxygen content of at least 30% by volume. So long as the oxygen-containing gas has an oxygen concentration of at least 30% by volume, the BOD content of incoming waste water can be substantially completely oxygenated in a single vessel in accordance with the process of the present invention.

The method employs oxygen supplied at a concentration of at least about 30% by volume and preferably in the range of 30–50% by volume and includes the step of maintaining the organisms at a preferred concentration of more than 16,000 ppm. In accordance with a preferred embodiment, the head space gases are periodically mixed with oxygen of a purity of more than about 50% by volume to assure that the gas contacting the BOD-rich biologically active mass contains at least 30% by volume oxygen.

In a preferred method the proportion of organisms to BOD is between about 0.1 to 1 and about 10.0 to 1.

For a better understanding of the present invention, reference should be made to the following description taken in conjunction with the drawings in which:

FIG. 2 is a graph comparing the recovery ability of the oxygen waste water system described above to the prior art system in which air is used.

Figure 1:
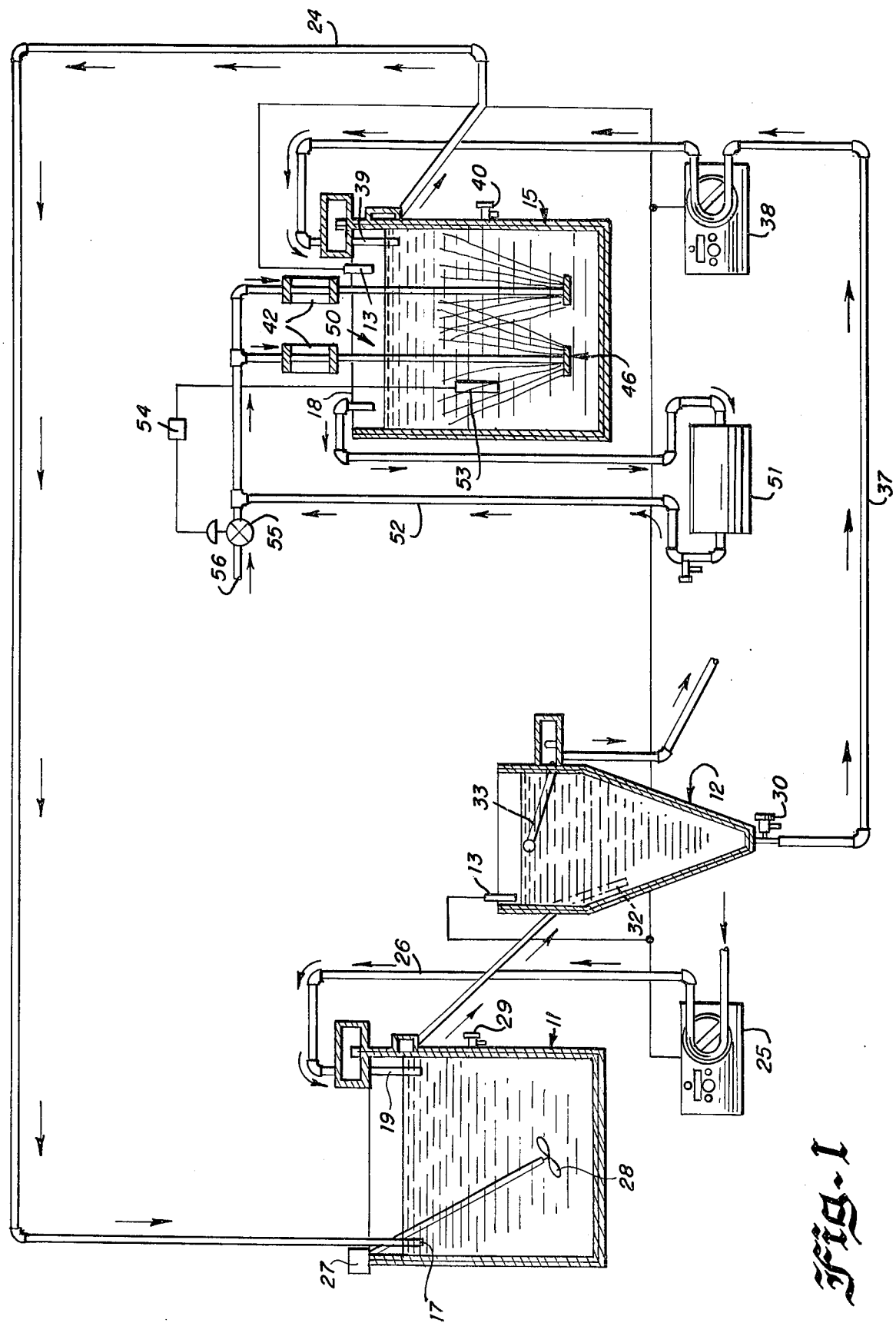
FIG. 1 is a general flow diagram.

Referring to FIG. 1, raw waste is mixed in a mixed liquor vessel 11 with activated sludge for removal of organic contaminants found in the raw waste. In this mixed liquor chamber 11 the activated sludge is deactivated, that is its condition is changed from activated or "hungry" sludge to "food-rich" sludge by the absorption and adsorption of the soluble organic contaminants from the contacted waste water. After a suitable mixing time, the raw waste and sludge from the mixed liquor vessel 11 are delivered to a clarifier 12 in which the food-rich sludge and the treated waste water, having a low BOD content, are separated. Clarifier 12 constructions are well known to those skilled in the art and may include a rotatable scraper (not shown) at the lower end. If desired, liquid level controls 13 (as known in the art) can be inserted into the mixed liquor and oxygenation vessels.

The effluent waste water is low enough in BOD content that it can be discharged into the nearest water source. The "food-rich" sludge is delivered to the sealed stabilization or oxygenation vessel 15 where, by contacting this sludge with an oxygen-containing gas having at least 30% by volume oxygen, the sludge assimilates the organic contaminants. Any type of cover 18 can be used to seal the oxygenation vessel 15. The activated or "hungry" sludge which results from the oxygenation step is returned to the mixed liquor chamber 11 for absorption and adsorption of the BOD content of the feed raw waste to complete the cycle.

DETAILED DESCRIPTION

Referring to FIG. 1, raw waste enters mixed liquor vessel 11 by means of inlet 19 through pump 25 and conduit 26. Activated sludge from the oxygenation vessel 15 is fed into the mixed liquor vessel 11 by means of inlet 17. The activated sludge and raw waste in the mixed liquor vessel 11 are gently mixed to create a flow of material in which the microorganisms constituting the sludge are able to make contact with the organic pollutant material in the influent raw waste so that the soluble organic materials are absorbed and adsorbed by the cells of the microorganisms. Any type of gentle agitation can be used, for example, a mechanical agitator 27 having one or more impellers 28. Any other type of gentle agitation can also be used, for example, bubbling air or an inert gas such as nitrogen up through the influent raw waste and sludge mixture. Any type of gas/liquid contacting means can be used, such as a sparger. Samples of the mixed liquor can be taken at sample valve 29. Sludge can be wasted to a digester through sludge wasting valve 30.

It was found that with a flow of 6 cubic feet per hour of gas for agitation in a 10-gallon mixed liquor vessel 11, the final effluent was clearer than with a flow of 12 cubic feet per hour. The higher agitation caused a breaking or shearing of the gelatinous mass of sludge which caused the sludge to settle more slowly in the clarifier. As a result, more BOD material was carried away with the effluent. Therefore, only enough agitation is needed to keep the sludge from settling in the mixed liquor vessel. The agitation should not be so vigorous that a breaking-up or shearing of the gelatinous sludge masses occurs.

Baffles or other designs commonly used in vessels to provide intimate contact of the contents can be used in the design of the vessels for this process. Vigorous agitation is not desirable since the breaking up of the accumulated cell matrices caused by vigorous agitation creates a sludge settling problem in the process of any waste water clarification system. The system described herein is advantageous in that vigorous agitation is not required in the mixed liquor vessel 11. The problem of high BOD levels in the effluent due to vigorous agitation is therefore not present in the instant system. For a discussion of the problems associated with the comminution of agglomerates of bacteria due to vigorous agitation, see the Robinson Pat. No. 3,547,813.

We have found that oxygen is not necessary in the mixed liquor vessel 11. If inexpensive supplies of an inert gas such as nitrogen are available, the inert gas may be metered in from a gas supply through flow meters (not shown) to agitate the contents of the mixed liquor vessel 11 through spargers (not shown). After a period of mixing sufficient to remove 90% or more of the BOD content in the feed waste water, for example, about 20 minutes, the mixed liquor enters the clarifier 12 by means of conduit 32. Conduit 32, preferably feeds into the clarifier at a point well below the effluent/sludge interface to prevent excessive agitation of the precipitated "food-rich" sludge. The clear effluent is drawn off by means of overflow weir 33. The precipitated "food-rich" sludge is accumulated in the lower portion of the clarifier 12 and recycled to the oxygenation vessel 15 by means of conduit 37 and pump 38, through inlet 39. Samples of the oxygenation vessel liquor can be taken at sample valve 40.

When the oxygenation tank is fully enclosed with a gas-tight, cover, oxygen (preferably substantially pure) is periodically mixed with the recycled head space gas to replace the oxygen consumed in oxygenation, and to maintain the gas emerging from spargers 46 at an oxygen concentration of at least 30% by volume. The gas mixture is introduced to the oxygenation vessel through flow meters 42 and spargers 46. Any gas-liquid contact means can be used in place of spargers 46.

As an alternative to an enclosed oxygenation vessel, tiny bubble or microbubble diffusers can be used for a very efficient dissolving of oxygen in the oxygenation vessel sludge liquor. When such diffusers are used, the efficiency is so high that very little oxygen escapes after passage through the liquor. The small amount of oxygen which would be saved by having a gas-tight cover over the oxygenation vessel when a microbubble diffuser is used may not economically justify the added expense for a vessel cover. In such a case, the oxygenation vessel can be left open to the atmosphere and the recycling step eliminated. This is a question of economics which must be worked out according to the size and other parameters in each particular system.

When microbubble diffusers are used, without the gas recycling step, a secondary means for agitating the sludge liquor in the oxygenation vessel may be necessary since the amount of oxygen passing through the diffusers may not be sufficient for agitation. However, any means for agitation can be used, such as mechanical agitators or by adding another gas such as air or an inert gas to the oxygen for passage through the diffusers. However, the incoming flow of "food-rich" sludge from the clarifier should provide enough agitation in the oxygenation vessel without a secondary agitation means.

An important advantage of the present invention is that the amount of oxygen fed to the oxygenation chamber can be varied to correspond to that necessary for treatment of the particular BOD level of waste water being fed to the system at any particular time without affecting the agitation in the oxygenation vessel, and, more importantly, without affecting the absorption and adsorption of organic pollutants by the sludge. The amount of agitation can remain constant although the oxygen flow rate is varied, simply by varying the rate of addition of oxygen through valve 55. Should the amount of BOD in the influent liquor fall to such a low level that the oxygen required for treatment is insufficient to maintain the organisms in a satisfactory condition of aerobic growth, an alternate embodiment of the process of this invention may be employed. According to this embodiment of the process, the quantity of recycled organisms is controlled so that when in a highly activated state, the quantity is adequate for treatment of the BOD in the influent water. Since analysis for BOD by some procedures requires too great a time to be used for this control, the quantity of organisms to be recycled may be adjusted according to a program developed from historical BOD information or, alternatively, a relationship may be established between BOD and some much more rapid chemical method of analysis; the quantities of organisms are adjusted accordingly.

Theoretically, only about one pound of oxygen need be used for each pound of BOD removed from the incoming waste water. The oxygen can be conserved quite readily in the herein described system in that oxygen is consumed only where oxygenation takes place, because the amount of oxygen supplied to the oxygenation stage of the system can be varied to control the DO in the system, but not to affect any other important variables, as described above.

The bubbles of oxygen serve to agitate the "food-rich" organisms as well as to supply the oxygen required for rapid metabolism of the organic pollutants in the deactivated organisms. The BOD content in the sludge is metabolically oxygenated to such a degree that the thus-activated sludge is capable of absorbing and adsorbing 90% or more of the BOD content of an influent raw waste water when mixed therewith in the mixed liquor vessel 11. It should be noted that in the oxygenation vessel 15 only concentrated "food-rich" sludge is oxygenated, thus minimizing the requirements for oxygen.

During oxygenation, the organisms may be present at a concentration of more than about 10,000 parts per million and satisfactory activation has been achieved at concentrations of greater than 16,000 parts per million. Activation of the organisms at this high concentration provides a further advantage of the invention in that the capacity of the oxygenation vessel may be proportionally smaller which reduces the overall costs of this system and provides more intimate contact between the oxygen and the organisms. Further, in a preferred embodiment any oxygen which accumulates in head space 50 can be recycled by means of pump 51 and conduit 52 and thereby utilized in the oxygenation procedure. Thus, oxygen is not wasted in the process as described. The recycle rate can be monitored by way of flow meters 42.

The amount of oxygen added to the recycle head space gases or to the microbubble diffusers can be controlled in response to the dissolved oxygen (DO) in the oxygenation vessel 15. For example, a probe 53 can be inserted into the oxygenation liquor and connected to a DO analyzer 54. The analyzer transmitter can be set to send a signal to control a valve 55 when the DO reaches a predetermined value, for example, 5 ppm. Thus, when the DO drops because of a sudden surge of high BOD content, valve 55 will be automatically opened to allow oxygen to be metered into the oxygenation vessel 15 from conduit 56. When the DO reaches a desired maximum, for example, 5 ppm., a signal will be sent from the analyzer 54 to close valve 55. Unreturned or excess activated sludge can be removed at the sludge wasting valve 30 and fed to a digester for biological volume reduction. Such excess waste sludge may be disposed of by methods well known by those skilled in the art, for example, by aerobic digestion or more economically by anaerobic digestion.

While the process described above uses oxygen in a highly efficient fashion, the addition of excess oxygen, through an abundance of caution, is not harmful but is restricted by economic considerations. The excess, however, is generally not necessary and, surprisingly, the process of this invention has on occasion required only about 0.75 pounds of oxygen utilized per pound of BOD consumed; thus the efficiency was greater than 100%. Although the exact mechanism by which this extremely high efficiency was achieved is not entirely understood, it has been postulated that adsorbed BOD was removed by the organisms and discharged to waste without the need of oxygen for the removal of this quantity of BOD. Possibly the activation of the organisms in the high levels of more than about 10,000 parts per million so modifies the growth pattern of the organisms that their adsorption characteristics are greatly enhanced, thus accomplishing the removal of BOD from waste water and enabling its transfer to a subsequent sludge wasting operation.

We have found that oxygen can be most efficiently used in the waste water treatment process if used only for the oxygenation step. In accordance with the process of the present invention, the detention times are decreased to less that 30 minutes in the absorption step and less than one hour in the oxygenation step of the process. Such short detention times and therefore the corresponding small vessel volumes required were quite unexpected. It was surprisingly found that when an oxygen-containing gas having at least 30% by volume oxygen is used for oxygenation of the "food-rich" sludge which has been separated from the mixed liquor vessel and when the head space oxygen is recycled, oxygen is not wasted. If the microbubble diffusers are used and the oxygenation vessel left open to the atmosphere, very little oxygen is wasted. Detention times of greater than 30 minutes in the absorption vessel and greater than 60 minutes in the oxygenation vessel produce no improved results. This feature of the invention was quite surprising since, as mentioned above, in the standard contact stabilization units detention times of up to 9 hours were required to achieve a 90% to 95% BOD removal from the raw waste water.

It was further found that by using oxygen in a concentration of at least 30% by volume for oxygenation, the system was very well adapted to handle upsets in the system. Applicants' system can treat a high BOD content waste water without an increase in the detention times in either the absorption zone or the oxygenation zone of the system. An upset therefore does not cause a lasting change in the steady state of the system described herein and therefore does not cause a significant loss of efficiency in the system as would occur in other systems. When an upset occurs, it is necessary to increase the oxygen rate if the incoming BOD levels are markedly increased. This is usually not necessary unless drastic increases in BOD levels in the raw waste water are experienced.

Applicants' process requires no oxygen whatsoever in the mixed liquor vessel 11. To verify this fact, runs have been made with the same flow rates as shown in Examples 1-7 to follow in which both the incoming raw waste water and the sludge were purged with nitrogen to remove oxygen contained therein prior to mixing the two ingredients together in the mixed liquor vessel 11. After combining the two materials, nitrogen was used as a means for agitation in the mixed liquor vessel 11 without the addition of either air or oxygen. It was found that with nitrogen as the sole agitation gas the activated sludge had absorbed and adsorbed 90% to 95% of the BOD content in the waste water in less than 30 minutes.

The waste water treatment method described herein can be operated with dissolved oxygen in the mixed liquor vessel 11. The surprising feature of this method is the fact that no dissolved oxygen is required. Normally, when practicing this invention, the dissolved oxygen in the mixed liquor vessel 11 is kept below ½ ppm so that no substantial amount of oxygenation of the biologically active mass occurs in the mixed liquor vessel 11. However, higher dissolved oxygen concentrations can be used.

The following examples are intended to more adequately define applicants' invention.

The apparatus shown in FIG. 1 was used in the following examples and all measurements were taken in accordance with the standard practice of the waste treatment industry as, for example, outlined in "Standard Methods for the Examination of Water and Waste water Including Bottom Sediments and Sludges" published by the American Public Health Association, Inc., 11th Ed. (1962).

EXAMPLES 1-7

Examples 1-7 compare the waste water treatment system of the invention to a prior art system using air: in the system described herein, the head space gas from a closed stabilization (oxygenation) vessel is recycled and supplemented with make-up oxygen, as previously set forth — in the prior art system, an uncovered stabilization vessel is provided and air is used for metabolism of the waste-enriched sludge. The data from these examples are given in Table I, the columns labeled "$O_2$" being data collected from the waste water treatment system of the present invention, and the data from the columns labeled "Air" were collected from the conventional "air" system.

In the "$O_2$" system, raw waste and activated sludge from the sealed stabilization vessel 15 were each fed into a 10 gal. mixed liquor vessel 11 at the rate of 0.625 l./min. to achieve an average retention time of 30 minutes in the mixed liquor vessel 11. Agitation in the mixed liquor vessel 11 was provided by supplying 6 cubic feet/hour of air through spargers. Oxygen and recycle gas was suppled to the 10 gal. sealed stabilization vessel 15 through spargers 46 at a rate of a total of 12 cubic feet/hour — oxygen being fed to make up the oxygen depletion in the recycle gas-oxygen content. Reactivated sludge was fed into the stabilization vessel 15 at a rate of 0.625 l./min. Procedures outlined in Standard Methods were followed for all tests. The clarifier had a 90-liter volume.

In the "air" system, the same size vessels were used for the stabilization vessel 15 (10 gal.), mixed liquor vessel 11 (10 gal.) and clarifier 21 (90 liter). The same flow rates were maintained at 0.625 l./min. raw waste for a 30-minute retention time in the mixed liquor vessel 11, .625 l./min. feed of reactivated sludge to the stabilization vessel 15, 6 cubic feet/hour of air through spargers in the mixed liquor vessel 11, and 12 cubic feet/hour of air through spargers 46 in the stabilization vessel 15. The only difference from the "$O_2$" system was the use of air in the uncovered stabilization vessel 15 rather than oxygen-supplemented recycled head space gas.

Average values for the data from these examples can be found in the last two columns of Table I.

Reference can be made to "Standard Methods" previously cited, for definitions of abbreviations used in the following examples and how these tests were performed, although these abbreviations are commonly known to those skilled in the art.

TABLE I

| PARAMETER | Example 1 | | Example 2 | | Example 3 | | Example 4 | |
|---|---|---|---|---|---|---|---|---|
| | $O_2$ | Air | $O_2$ | Air | $O_2$ | Air | $O_2$ | Air |
| Stabilization Vessel DO (mg/l) | 5.3 | .63 | 7.9 | .95 | 5.7 | .56 | 11.3 | 1.05 |
| Mixed Liquor DO (mg/l) | .15 | .17 | .58 | .27 | .65 | .33 | .8 | .16 |
| Raw Wastewater DO (mg/l) | .25 | .25 | .52 | .52 | .35 | .35 | .25 | .25 |
| Clarifier Effluent DO (mg/l) | .32 | .28 | .47 | .28 | .4 | .30 | .32 | .3 |
| Stabilization Vessel pH | 6.5 | 7.22 | 6.55 | 7.22 | 6.62 | 7.3 | 6.6 | 7.25 |
| Mixed Liquor pH | 6.95 | 7.33 | 6.95 | 7.21 | 7.02 | 7.4 | 7.0 | 7.35 |
| Raw Wastewater pH | 7.15 | 7.15 | 7.27 | 7.27 | 7.4 | 7.4 | 7.3 | 7.3 |
| Clarifier Effluent pH | 7.0 | 7.3 | 7.05 | 7.3 | 7.1 | 7.32 | 7.1 | 7.4 |
| Stabilization Vessel Temp. ° C | 18.1 | 17.6 | 18.8 | 18.7 | 18.35 | 18.25 | 19.1 | 18.8 |
| Mixed Liquor Temp. ° C | 17.6 | 17.7 | 18.8 | 18.7 | 18.3 | 18.25 | 19.1 | 18.8 |
| Raw Watewater Temp. ° C | 18.5 | 17.5 | 18.5 | 18.5 | 18.25 | 18.25 | 19.5 | 19.5 |
| Clarifier Effluent Temp. ° C | 18.5 | 17.4 | 18.75 | 18.4 | 18.35 | 18.45 | 19.4 | 18.8 |
| Wastewater Influent BOD (mg/l) | 145 | 145 | 163 | 163 | 190 | 190 | 195 | 195 |
| Clarifier Effluent BOD (mg/l) | 13 | 28 | 14 | 32 | 16 | 52 | 10 | 46 |
| BOD Reduction (%) | 91 | 80.7 | 91.5 | 80.9 | 91.5 | 72.5 | 94.5 | 76 |
| Headspace, % Oxygen | (by volume) | 24.8 | — | 32.2 | — | 25.3 | — | 34.5 |
| Oxygen % of Gas into Oxygenation Vessel | 30.5 | 21− | 37.4 | 21− | 31.0 | 21− | 39.5 | 21− |

TABLE I-continued

| | | | | | | | | |
|---|---|---|---|---|---|---|---|---|
| Pounds of BOD Removed per Day based on 1000 cu. ft. Vessel Capacity | 96.5 | 85.0 | 113.4 | 99.6 | 132.3 | 105.0 | 140.7 | 113.4 |
| Wastewater Influent TSS (mg/l) | 87 | 87 | 186 | 186 | 242 | 242 | 188 | 188 |
| Clarifier Effluent TSS (mg/l) | 15 | 32 | 31 | 40 | 19 | 53 | 8 | 40 |
| TSS Removal (%) | 82.8 | 63.3 | 83 | 78 | 78 | 78 | 69 | 79 |
| Wastewater Influent VSS (mg/l) | 70 | 70 | 156 | 156 | 204 | 204 | 170 | 170 |
| Mixed Liquor Suspended Solids (mg/l) | 5600 | 4120 | 4190 | 3490 | 4480 | 3970 | 4430 | 3940 |
| Mixed Liquor VSS (mg/l) | 4500 | 3380 | 3490 | 2950 | 3670 | 3320 | 3600 | 3280 |
| Oxygenated Sludge TSS (mg/l) | 9540 | 7800 | 8600 | 6640 | 8540 | 6440 | 8740 | 7320 |
| Oxygenated Sludge VSS (mg/l) | 7740 | 6480 | 7100 | 5700 | 7140 | 5420 | 7140 | 6080 |
| Sludge % VSS | 81.1 | 83 | 82.5 | 85.8 | 84 | 84 | 82 | 83 |
| SVI (Mixed Liquor) | 170 | 236 | 190.9 | 257.8 | 177 | 229 | 202 | 203 |
| Effluent VSS (mg/l) | 12 | 24 | 24 | 34 | 16 | 50 | 6 | 39 |
| Sludge-Age - Days | 5.3 | 2.0 | 2.3 | 1.4 | 3.8 | 1.0 | 9.2 | 1.5 |
| Food/Microorganism Ratio | .287 | .365 | .373 | .466 | .462 | .570 | .440 | .515 |

| PARAMETER | Example 5 | | Example 6 | | Example 7 | | Average of Examples 1–7 | |
|---|---|---|---|---|---|---|---|---|
| | $O_2$ | Air | $O_2$ | Air | $O_2$ | Air | $O_2$ | Air |
| Stabilization Vessel DO (mg/l) | 11.2 | .61 | 11.1 | .7 | 9.4 | .73 | 8.8 | .74 |
| Mixed Liquor DO (mg/l) | .5 | .42 | .7 | .3 | 3.2 | .5 | .94 | .30 |
| Raw Wastewater DO (mg/l) | .4 | .4 | 1.6 | 1.6 | .3 | .3 | .48 | .48 |
| Clarifier Effluent DO (mg/l) | .6 | .45 | 1.25 | .9 | .6 | .5 | .56 | .43 |
| Stabilization Vessel pH | 6.6 | 7.2 | 6.6 | 7.2 | 6.5 | 7.2 | 6.6 | 7.2 |
| Mixed Liquor pH | 6.88 | 7.35 | 6.83 | 7.2 | 6.9 | 7.4 | 6.9 | 7.3 |
| Raw Wastewater pH | 7.3 | 7.3 | 7.05 | 7.05 | 7.3 | 7.3 | 7.2 | 7.2 |
| Clarifier Effluent pH | 7.0 | 7.3 | 6.9 | 7.2 | 7.0 | 7.4 | 7.0 | 7.3 |
| Stabilization Vessel Temp. °C | 19.3 | 18.8 | 19.0 | 18.6 | 17.6 | 17.0 | 18.6 | 18.2 |
| Mixed Liquor Temp. °C | 19.1 | 18.8 | 18.8 | 18.5 | 17.3 | 17.0 | 18.4 | 18.2 |
| Raw Wastewater Temp. °C | 19.1 | 19.1 | 18.2 | 18.2 | 15.8 | 15.8 | 19.2 | 18.1 |
| Clarifier Effluent Temp. °C | 19.0 | 18.8 | 18.6 | 18.5 | 17.5 | 16.8 | 18.6 | 18.2 |
| Wastewater Influent BOD (mg/l) | 212 | 212 | 261 | 261 | 283 | 283 | 207 | 207 |
| Clarifier Effluent BOD (mg/l) | 17 | 66 | 16 | 35.5 | 12 | 50 | 14 | 44 |
| BOD Reduction (%) | 92 | 69 | 94 | 86.6 | 96 | 82.7 | 93.2 | 78.7 |
| Headspace, % Oxygen | 32 | — | 29.5 | — | 44.5 | — | 31.8 | — |
| Oxygen % of Gas into Oxygenation Vessel | 37.2 | 21⁻ | 34.9 | 21⁻ | 48.7 | 21⁻ | 37.0 | 21⁻ |
| Pounds of BOD Removed per Day based on 1000 cu. ft. Vessel Capacity | 148.4 | 111.1 | 186.5 | 172.3 | 160.3 | 149.2 | 139.7 | 119.4 |
| Wastewater Influent TSS (mg/l) | 218 | 218 | 344 | 344 | 210 | 210 | 211 | 211 |
| Clarifier Effluent TSS (mg/l) | 16 | 58 | 25 | 69 | 23 | 38 | 19 | 47 |
| TSS Removal (%) | 73.3 | 63 | 73 | 80 | 89 | 82 | 89.5 | 77.5 |
| Wastewater Influent VSS (mg/l) | 186 | 186 | 272 | 272 | 162 | 162 | 174 | 174 |
| Mixed Liquor Suspended Solids (mg/l) | 4790 | 4200 | 4280 | 3820 | 4100 | 3700 | 4552 | 3891 |
| Mixed Liquor VSS (mg/l) | 4000 | 3530 | 3600 | 3200 | 3310 | 3000 | 3738 | 3237 |
| Oxygenated Sludge TSS (mg/l) | 8660 | 7440 | 8540 | 7020 | 8180 | 7680 | 8685 | 7191 |
| Oxygenated Sludge VSS (mg/l) | 7180 | 6680 | 7230 | 6000 | 6380 | 6210 | 7130 | 6091 |
| Sludge % VSS | 83 | 89.5 | 84.5 | 85 | 77 | 81 | 82 | 84.6 |
| SVI (Mixed Liquor) | 182 | 187 | 216 | 210 | 244 | 219 | 197 | 220 |
| Effluent VSS (mg/l) | 12 | 51 | 6 | 46 | 3 | 30 | 11 | 37 |
| Sludge-Age - Days | 4.5 | 1.1 | 2.9 | .9 | 3 | 2.0 | 4.4 | 1.4 |
| Food/Microorganism Ratio | .460 | .513 | .590 | .701 | .716 | .638 | .470 | .538 |

In Examples 8 and 9 an attempt was made to cause a major "upset" in the system to show one of the major advantages of the present invention — the ability to rapidly recover from a drastic change in conditions of the raw waste and/or sludge during operation.

EXAMPLE 8

In this example the upset was accomplished by discontinuing the oxygen supply to the sealed oxygenation vessel 15. The only gas fed to the oxygenation vessel 15, therefore, was the recirculated headspace gas, which provided agitation but was deficient in oxygen. The dissolved oxygen was quickly utilized which caused some of the aerobic organisms to be converted to anaerobic condition. After a three-day upset, the oxygen was reinstituted to see whether rapid recovery of the system to normal operational performance was possible.

By reducing the available dissolved oxygen in the oxygenation liquor, an artificially high BOD to dissolved oxygen ratio was produced. The resulting system was comparable to a system receiving a high BOD loading with a low aeration capacity. The result was that the oxygen level in the headspace dropped to less than 10% for the system with a corresponding DO of less than 0.5 ppm in the oxygenation liquor. During this "upset" test, the biological performance of the system dropped appreciably. The system which had previously produced effluents of not greater than 21 ppm with an influent of as great as 184 ppm, now produced a 46.5 ppm effluent on an influent of 122 ppm.

When the oxygen supply was reinstituted, excess oxygen was supplied to provide a high dissolved oxygen concentration in the oxygenation chamber 15. The resulting effluent quickly approached the high quality obtained before the upset was induced.

Except for cutting off the oxygen supply to the oxygenation chamber to establish the "upset" conditions, the same size vessels and flow rates as used in Examples 1–7 were used in Example 8. The following data were collected after recovery from artificial upset conditions described above:

| PARAMETER | Example 8 |
|---|---|
| Stabilization Vessel DO (mg/l) | 7.6 |
| Mixed Liquor DO (mg/l) | 2.0 |
| Raw Wastewater DO (mg/l) | 4.3 |
| Clarifier Effluent DO (mg/l) | 0.8 |
| Stabilization Vessel pH | 6.7 |
| Mixed Liquor pH | 7.2 |
| Raw Wastewater pH | 7.6 |
| Clarifier Effluent pH | 7.6 |
| Stabilization Vessel Temp °C | 17.7 |
| Mixed Liquor Temp °C | 15.8 |
| Raw Wastewater Temp °C | 13.6 |
| Clarifier Effluent Temp °C | 16.0 |
| Wastewater Influent BOD (mg/l) | 136.0 |
| Clarifier Effluent BOD (mg/l) | 11.5 |
| BOD Reduction (%) | 91.5 |
| Oxygen Utilized (lb) per Lb. BOD Consumed | 1.23 |

-continued

| PARAMETER | Example 8 |
|---|---|
| Headspace (%) Oxygen | 22.5 |
| Lbs. of BOD Removed Daily based on 1000 cu. ft. Vessel Capacity | 117.6 |
| Mixed Liquor Suspended Solids (mg/l) | 2580 |
| Mixed Liquor VSS (mg/l) | 2070 |
| Oxygen Activated Sludge TSS (mg/l) | 5250 |
| Oxygen Activated Sludge VSS (mg/l) | 4080 |
| Sludge (%) VSS | 77 |
| SVI (Mixed Liquor) | 186 |
| Food/Microorganism Ratio | .3530 |

In Example 8, at the microscopic level, the following was observed:

During upset, deterioration of the sludge was rapid, upon reducing the oxygen supply to the system. Filamentous microorganisms, previously undetected, were increasingly predominant in the sludge. Upon conversion to a more abundant oxygen supply, the number of filamentous-type microorganisms was reduced and a healthier sludge was developed.

The artificially-induced "upset" provided data that were consistent with expectations. At the low dissolved oxygen levels, the waste water treatment system was expected to deteriorate. The deterioration was visible in the general appearance of the effluent and sludge. The effluent became increasingly turbid as the "upset" continued, and filamentous microorganisms began to increase in the sludge. The BOD data also indicated the gradual deterioration of the treatment efficiencies. Upon the addition of oxygen to the system, the system quickly began to improve its treatment efficiency. The appearance of the sludge and effluent improved, and was almost at pre-test conditions when the test was terminated.

EXAMPLE 9

In Example 9 an upset was accomplished by killing many of the sludge microorganisms with a solvent. This was done both in the "$O_2$" system and the conventional "air" system and each system was then compared for rapidity of recovery. The same size vessels and same flow rates of sludge, raw waste, and mixed liquor agitation gas as used in Examples 1–7 were used in Example 9. The flow rate of the gas to the stabilization vessel 15 was recycled at 20 cubic feet/hour in each system. Since recovery can best be measured by the ability of a system to continue to reduce the BOD content of the incoming raw waste, the BOD levels were measured for both the "$O_2$" and "air" systems before and after the "upset".

When the "upset" was induced, the percent BOD reduction in both systems dropped to about 45%. At this point it was observed that the "air" system needed more air to keep some of the sludge microorganisms of that system alive. For the purpose of comparison, so that the "air" system would not completely fail, the air flow to the "air" system was tripled to 60 cubic feet per hour. Such an increase of air would be impossible in a conventional air stabilization system due to the capacity of the equipment, but for the purpose of comparison with the "$O_2$" system of the present invention, the amount of air was tripled to prevent the "air" system from failure.

Even when the "air" system was so favored, the rapidity of recovery of the "$O_2$" system was extremely better than the recovery of the "air" system. It was quite astonishing and unexpected that the "$O_2$" system was completely recovered in less than two days, whereas the "air" system had only recovered to about half of its pre-upset percent BOD reduction. Referring more particularly to FIG. 2, the graph shows the recovery of the two systems as described in Example 9. The "$O_2$" system of the present invention is represented by the solid line, and the "air" system by the broken line. Pre-upset conditions, represented at day 0 show BOD reduction at about 92% for the "$O_2$" system (A) and about 85% for the "air" system (B). At this point a solvent was charged to each system and at the end 1 day, each system was at about a 45% BOD reduction (C). The recycle gas flow rate of the "$O_2$" system was continued at 20 cubic feet per hour and the air rate for the "air" system was increased to 60 cubic feet per hour, as explained above. At point C each system was upset to the maximum and each system began to recover. After two days, the "$O_2$" system was completely recovered to a BOD reduction of more than 90% (D). The "air" system, after 2 days, had only recovered to about 69% BOD reduction (E).

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A method of reducing the BOD content of BOD-containing waste water which comprises:
    contacting influent BOD-containing water in a mixing vessel with an effective amount of a biologically active mass which biologically active mass has metabolized its BOD content, said biologically active mass sorbs BOD from said water to form a BOD-rich biologically active mass and reduces the BOD content of the water without substantial oxygenation of the biologically active mass and with substantially no metabolism of the biologically active mass occurring in said mixing vessel;
    transferring the mixture of the BOD-rich biologically active mass and reduced BOD content water to a clarifier;
    separating the reduced BOD content water as an effluent from the BOD-rich biologically active mass;
    discharging a portion of the BOD-rich biologically active mass from the clarifier;
    transferring the remainder of the BOD-rich biologically active mass to a separate oxygenation vessel;
    metabolizing the transferred BOD-rich biologically active mass by intimately contacting said biologically active mass in the oxygenation vessel with an oxygen containing gas having an oxygen content of at least 30% by volume to restore the capacity of the sludge to sorb substantial quantities of BOD, and recycling said biologically active mass back to said mixing vessel to contact said BOD-containing water.

2. A method according to claim 1 wherein the oxygen is dispersed in the form of tiny bubbles for maximum gas-liquid interfacial contact.

3. A method according to claim 1 including mixing the BOD-rich biologically active mass in the oxygenation vessel with an agitation means in addition to the dispersing oxygen.

4. A method according to claim 1 wherein the average detention time in the mixed liquor vessel is less than about 30 minutes and the average detention time of the material in the oxygenation vessel is less than about 60 minutes and wherein the resulting effluent from the mixed liquor vessel has less than about 10% of its initial BOD.

5. A method according to claim 1, in which more than 75% of the dispersed oxygen is retained in the BOD-rich biologically active mass, thereby substantially oxygenating the BOD content in the biologically active mass.

6. The method as defined by claim 1 wherein the quantity of BOD-rich biologically active mass transferred to the oxygenation vessel is controlled to provide a quantity of biologically active mass sufficient to treat the influent water.

7. A method of treating waste water having a BOD content of more than 10 ppm comprising the steps of mixing raw waste water with an activated biologically active mass at a waste metabolizing concentration of more than about 10,000 ppm of activated organisms in a mixing vessel without substantial oxygenation of the mixture in said vessel such that substantially no metabolism of the biologically active mass occurs in said vessel to form reduced BOD content water and a BOD-rich biologically active mass, said BOD-rich biologically active mass having adsorbed and absorbed BOD from said waste water, transferring the substantially non-oxygenated mixture to a clarifier to separate the BOD-reduced water from the BOD-rich biologically active mass, supplying an oxygen containing gas having an oxygen concentration of at least 30% by volume to at least a portion of the BOD-rich biologically active mass in a separate oxygenation vessel to metabolize the BOD-rich biologically active mass develop said activated organisms, and form said activated biologically active mass, and recycling said activated biologically active mass back to said mixing vessel to contact said raw waste water.

8. The method of claim 7 wherein the proportion of organisms to BOD is between about 0.1 to 1 and about 10.0 to 1.

9. The method of claim 7 including the step of maintaining the organisms at a concentration of more than about 16,000 ppm while adding oxygen to said oxygen containing gas to increase the oxygen concentration therein to 30–50% oxygen by volume.

10. The method of claim 7 wherein the activated organisms are added to the waste water in a quantity sufficient to absorb and adsorb substantially all of the BOD of the raw waste water.

11. A method of reducing the BOD content of BOD-containing waste water which comprises:
agitating influent BOD-containing water in a mixing vessel with an effective amount of a biologically active mass without any substantial oxygenation of the mixture such that substantially no metabolism occurs in said vessel to form a BOD-rich biologically active mass and reduced BOD content water;
transferring the mixture of BOD-rich biologically active mass and reduced BOD-content water to a clarifier;
separating the reduced BOD-content water as an effluent from the BOD-rich biologically active mass;
transferring a substantial portion of the BOD-rich biologically active mass to a separate enclosed oxygenation vessel having a head space above the BOD-rich biologically active mass;
removing at least a portion of the gases from the head space in the enclosed oxygenation vessel;
controllably adding oxygen to the removed head space gases to increase the oxygen content thereof substantially to at least 30% by volume of said removed head space gases, according to the particular oxygen demand of the BOD-rich biologically active mass and the DO content in the enclosed oxygenation vessel;
recycling the mixture of head space gas and oxygen back to the enclosed oxygenation vessel to substantially oxygenate and metabolize the BOD content in the biologically active mass; and
recycling the oxygenated biologically active mass to the mixing vessel for mixing with the influent BOD-containing waste water.

12. A method according to claim 11 wherein the average detention time in the mixed liquor vessel is less than about 30 minutes and the average detention time of the material in the oxygenation vessel is less than about 60 minutes and wherein the resulting effluent from the mixed liquor vessel has at least about 90% of the BOD removed.

13. In a method of reducing the BOD content of BOD-containing waste water including the steps of mixing influent BOD-containing water with an effective amount of an activated biologically active mass, separating the resulting BOD-rich biologically active mass from the resulting reduced BOD effluent and oxygenating a substantial portion of the BOD-rich biologically active mass to provide the activated biologically active mass for mixing with the influent BOD-containing water, the improvement comprising;
oxygenating a substantial portion of the BOD-rich biologically active mass in a separate oxygenation vessel with an oxygen-rich gas said gas having an oxygen concentration of at least 30% by volume to substantially completely metabolize said biologically active mass in said oxygenation vessel; and
mixing the BOD-containing water with said activated biologically active mass in a mixed liquor vessel without substantially oxygenating the mixture such that substantially no metabolism of the biologically active mass occurs in said mixed liquor vessel and transferring the resulting mixture of BOD-rich biologically active mass and reduced BOD-content water to a separator.

14. A method as defined by claim 13 wherein the BOD-rich sludge is activated by treatment with oxygen at a concentration greater than about 50% by volume.

* * * * *